No. 748,993. PATENTED JAN. 5, 1904.
F. E. SOUTHARD.
VEHICLE WHEEL.
APPLICATION FILED SEPT. 21, 1903.
NO MODEL.
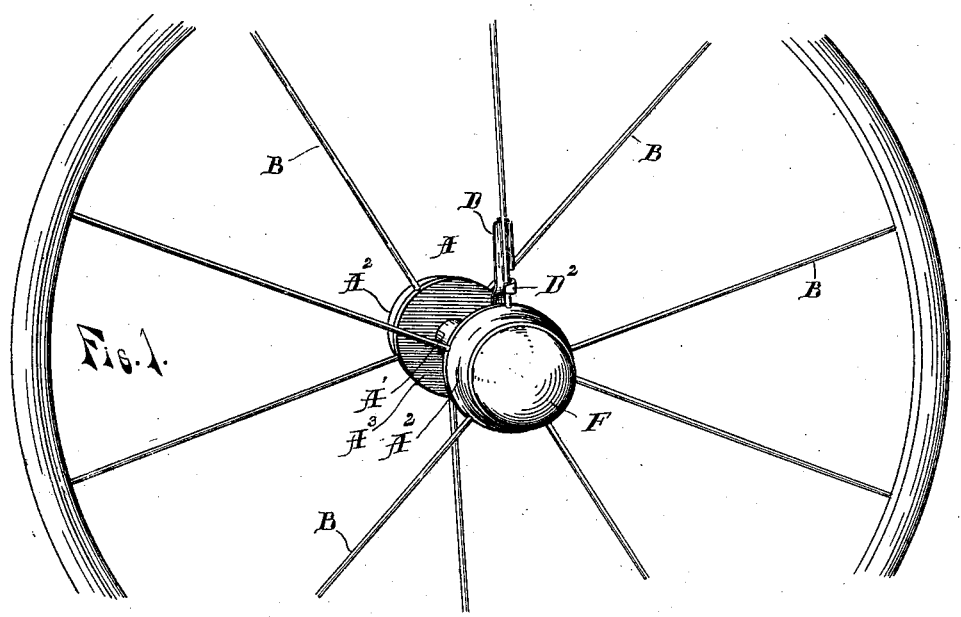
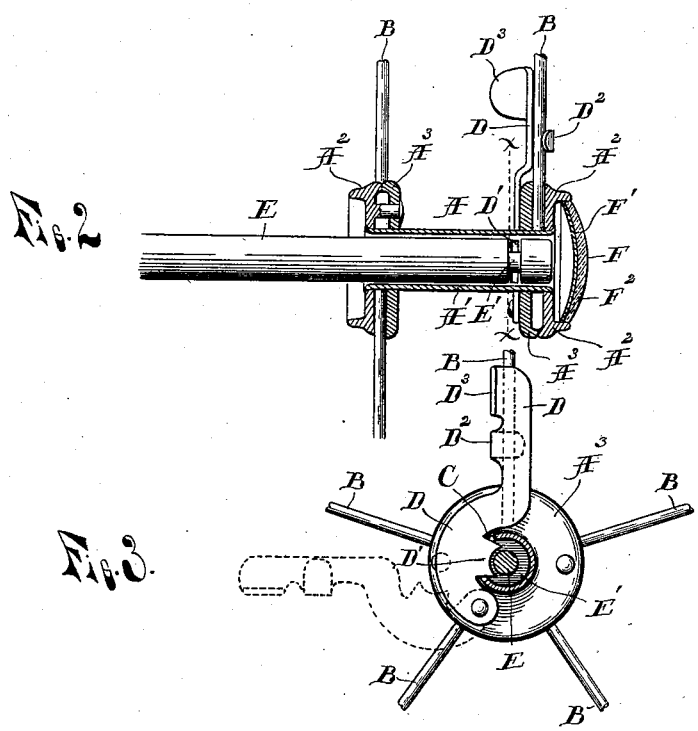
WITNESSES.
INVENTOR.
Frank E. Southard
Attorneys.

No. 748,993. Patented January 5, 1904.

UNITED STATES PATENT OFFICE.

FRANK E. SOUTHARD, OF TOLEDO, OHIO.

VEHICLE-WHEEL.

SPECIFICATION forming part of Letters Patent No. 748,993, dated January 5, 1904.

Application filed September 21, 1903. Serial No. 173,982. (No model.)

*To all whom it may concern:*

Be it known that I, FRANK E. SOUTHARD, a citizen of the United States of America, residing at Toledo, in the county of Lucas and State of Ohio, have invented certain new and useful Improvements in Vehicle-Wheels, of which the following is a specification, reference being had therein to the accompanying drawings.

This invention relates to improvements in vehicle-wheels, and especially to metal wheels for baby-carriages, go-carts, children's wagons, &c.

The object of the invention is to provide the wheel with means for detachably securing the same to the axle and in such a manner that a plain rod may be used as the axle, the fastening means being such that no shoulder or other projection is required at the inner side of the wheel and also such that a wheel having a hub which is closed at its outer end may be used.

A further object of the invention is to provide a suitable buffer for the outer end of the wheel-hub, which is thus prevented from injuring things with which it comes in contact and is thereby closed, thus preventing dirt from getting in and the wheel lubricant from getting out, and also to provide certain other new and useful features, all as hereinafter more fully described, reference being had to the accompanying drawings, in which—

Figure 1 is a perspective view of a wheel embodying the invention with portions of the rim broken away; Fig. 2, a longitudinal section through the hub, and Fig. 3 a transverse section of the same on the line $x\ x$ of Fig. 2.

A is the wheel-hub, consisting of the sleeve A' to receive the axle, to each end of which sleeve is secured a disk $A^2$, provided with a recessed outer side and also inner disks $A^3$, which are riveted to the outer disks, with the spokes B between. A slot C is cut in the sleeve A' adjacent to the disk $A^3$ at the outer end of the hub, and to said disk is pivotally attached at one end a flat lever D, which is curved to extend part way around the sleeve of the hub and provided with a lip D' to project inward through the slot C and engage an annular groove or cut E' in the axle E near the outer end of said axle. From the end of its curved portion said lever extends radially outward from the hub and is bent laterally to lie close to one of the spokes B and provided with an integral spring-finger $D^2$ to embrace the spoke and hold the lever with its lip D' engaging the groove in the axle to secure the wheel thereto. The end of the finger is so bent that in order to engage the spoke and clamp the same between it and the body of the lever the finger must be sprung outward slightly to allow the spoke to pass and will then spring inward and firmly hold the lever against accidental turning, an inwardly-bent lug $D^3$ being provided at the upper end of the lever, so that the lever may be easily turned by the operator when he desires to detach the wheel. The axle does not project through the hub, and as with this fastening there is no projecting nut the outer end of the hub may be closed to prevent dirt, &c., from getting in and also to retain the lubricant. Within the recess in the outer end of the hub or disk $A^2$ is fitted a sheet-metal disk F', secured therein in any desired manner and provided upon its outer face with a coating of rubber $F^2$ to form a buffer F to prevent the hub from injuring anything with which it may come in contact.

This form of fastening not only permits the use of a hub which is permanently closed at its outer end, but it also does away with the necessity of providing a shoulder or its equivalent on the axle to engage the inner end of the hub and prevent the wheel from sliding inward thereon, as the lip engaging the groove prevents the wheel from moving longitudinally on its axle in either direction and at the same time does not hinder its free rotation thereon.

Having thus fully described my invention, what I claim is—

1. In a wheel, the combination of a hub having an opening in one side thereof, a lever pivotally attached at one end to the hub, and a lip on said lever to project through the opening in the hub to engage a groove in the axle.

2. In a wheel, the combination of a hub having a slot extending through one side, a lever pivoted at one end to the hub and extending radially therefrom with its opposite end adjacent to the spokes of the wheel, a lip on said lever to project through the slot in the hub and engage a groove in the axle, and means on the lever for engaging one of the spokes to hold the lever from turning.

3. In a wheel, the combination with a hub consisting of a sleeve to receive the axle provided with a slot in one side and disks secured to the ends of said sleeve to which disks the spokes are secured, of a lever pivotally secured at one end to the disk at the outer end of the hub and extended radially outward therefrom adjacent to the spokes, a lip on said lever to project through the slot in the hub and engage a groove in the axle near its end, and a spring-finger on the lever to engage one of the spokes and hold the lever from turning.

4. In a wheel, the combination with a hub consisting of a sleeve to receive the axle provided with a slot in one side, and disks secured to the ends of said sleeve to which disks the spokes are secured at one end, of a lever pivotally attached at one end to the inner side of the inner disk at the outer end of the hub and curved to extend part way around the sleeve and extending radially outward therefrom adjacent to the spokes, a lip on said lever to project through the slot in the sleeve, a spring-finger on the lever to embrace one of the spokes, and a buffer secured within the outer end of the hub and closing the same.

In testimony whereof I affix my signature in presence of two witnesses.

FRANK E. SOUTHARD.

Witnesses:
F. B. CROSBY,
BERYL L. BOYER.